(12) United States Patent
Yamazaki et al.

(10) Patent No.: US 9,034,217 B2
(45) Date of Patent: May 19, 2015

(54) VOLTAGE NONLINEAR RESISTOR

(71) Applicant: NGK Insulators, Ltd., Nagoya (JP)

(72) Inventors: Satoshi Yamazaki, Nagoya (JP); Toru Hayase, Nagoya (JP); Kenji Morimoto, Kasugai (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/277,461

(22) Filed: May 14, 2014

(65) Prior Publication Data

US 2014/0361229 A1    Dec. 11, 2014

(30) Foreign Application Priority Data

Jun. 7, 2013  (JP) ................. 2013-120403

(51) Int. Cl.
*H01B 1/02* (2006.01)
*H01C 10/00* (2006.01)
*C01G 9/02* (2006.01)
*H01C 7/112* (2006.01)
*H01C 17/065* (2006.01)

(52) U.S. Cl.
CPC *H01C 10/00* (2013.01); *C01G 9/02* (2013.01); *H01C 7/112* (2013.01); *H01C 17/06546* (2013.01)

(58) Field of Classification Search
CPC ....... C04B 35/453; H01C 7/10; H01L 41/187

USPC ............................. 257/43; 252/502
See application file for complete search history.

(56) References Cited

U.S. PATENT DOCUMENTS

2011/0101333 A1\*  5/2011  Shionoiri et al. ............... 257/43

FOREIGN PATENT DOCUMENTS

| JP | H02-076204 | | 3/1990 |
| JP | 04-48746 | B2 | 8/1992 |
| JP | 2002-121067 | A1 | 4/2002 |
| JP | 2002121067 | A * | 4/2002 |

OTHER PUBLICATIONS

European Search Report, European Application No. 14170455.1, dated Nov. 27, 2014 (6 pages).
Ning, Jiang Li, et al. "Influence of Texture on Electrical Properties of ZnO Ceramics Prepared by Extrusion and Spark Plasma Sintering," *Ceramics International*, vol. 33, pp. 107-114 (2007)(8 pages).
Suvaci, Ender, et al. "Processing of Textured Zinc Oxide Varistors Via Templated Grain Growth," *Journal of the European Ceramic Society*, vol. 25, pp. 1663-1673 (2005)(11 pages).

\* cited by examiner

*Primary Examiner* — Khanh Tuan Nguyen
*Assistant Examiner* — Danny N Kang
(74) *Attorney, Agent, or Firm* — Burr & Brown, PLLC

(57) ABSTRACT

The present invention provides a voltage nonlinear resistor containing zinc oxide as a major component, wherein the degree of orientation f(100) of the (100) plane of zinc oxide is 0.40 or more and is represented by the following equation: f(100)=I(100)/(I(100)+I(002)+I(101)), where I(hkl) represents the peak intensity (integral) of a (hkl) plane.

2 Claims, 2 Drawing Sheets

VOLTAGE NONLINEAR RESISTOR

BACKGROUND OF THE INVENTION

1. Field of the Invention

The present invention relates to a voltage nonlinear resistor.

2. Description of the Related Art

Voltage nonlinear resistor elements (varistor elements) are elements having a structure in which a voltage nonlinear resistor is interposed between a pair of electrodes and are widely used in various sensors such as humidity sensors and temperature sensors, arresters for electric power systems, and the like, as elements for protecting electronic circuits or the like from abnormal voltage. FIG. 2 shows the current-voltage characteristic of a voltage nonlinear resistor. The voltage nonlinear resistor has an excellent protective function and low voltage VH in a high-current region surrounded by a dotted line in FIG. 2. It is known that in a voltage nonlinear resistor containing zinc oxide as a major component, the voltage VH decreases with the decrease in resistivity of inner portions of zinc oxide grains and the resistivity of the inner portions of the zinc oxide grains can be lowered in such a way that a trivalent element such as Al, Ga, or In is added to zinc oxide as a dopant so as to form a solid solution. Furthermore, zinc oxide is known to have a hexagonal crystal structure and anisotropic characteristics depending on a crystal structure.

Examples of the voltage nonlinear resistor containing zinc oxide as a major component include those disclosed in Patent Literatures 1 and 2. Patent Literature 1 discloses a voltage nonlinear resistor which is formed in such a way that acicular zinc oxide particles crystallographically grown in the c-axis direction are oriented in the c-axis direction, are molded, and are sintered. This voltage nonlinear resistor has been measured for varistor voltage in the a- and c-axis directions thereof. Patent Literature 2 discloses a (110) plane-oriented zinc oxide sintered body in view of the fact that the conductivity in the a-axis direction is high.

CITATION LIST

Patent Literatures

PTL 1: JP 4-48746 B
PTL 2: JP 2002-121067 A

SUMMARY OF THE INVENTION

However, in Patent Literature 1, though the acicular zinc oxide particles are oriented by extrusion molding, it is unclear how much the (100) or (110) plane is oriented in a plane (an upper surface in FIG. 1 of Patent Literature 1) which is parallel with an extrusion direction of the acicular zinc oxide particles. Furthermore, in Patent Literature 1, though the varistor voltage (the voltage in a flat region surrounded by a dashed-dotted line in FIG. 2) is described, the voltage VH in a high-current region is not described or suggested. On the other hand, in Patent Literature 2, the (110) plane of the zinc oxide sintered body is oriented and therefore the voltage VH in a high-current region may possibly be low. However, a high magnetic field needs to be applied in a specific direction in order to orient the (110) plane and therefore a special facility is necessary to produce the sintered body.

The present invention has been made to solve the above problems and has a primary objective to provide a voltage nonlinear resistor which has low voltage in a high-current region and which is readily fabricated.

A voltage nonlinear resistor according to the present invention contains zinc oxide as a major component. In the voltage nonlinear resistor, the degree of orientation f(100) of the (100) plane of zinc oxide is 0.40 or more and is represented by the following equation:

$$f(100)=I(100)/(I(100)+I(002)+I(101))$$

where I(hkl) represents the peak intensity (integral) of a (hkl) plane.

In the voltage nonlinear resistor according to the present invention, the (100) plane of zinc oxide is oriented and therefore an a-axis direction in which the conductivity of zinc oxide is high is oriented. Hence, the resistance in zinc oxide grains is low and the voltage in a high-current region can be kept low. Furthermore, the voltage nonlinear resistor according to the present invention can be relatively readily fabricated in such a way that a mixture of (100)-oriented plate-shaped zinc oxide particles and additive materials is formed into a (100)-oriented form by a method using shear force and the form is fired.

DETAILED DESCRIPTION OF THE INVENTION

Figure 1:
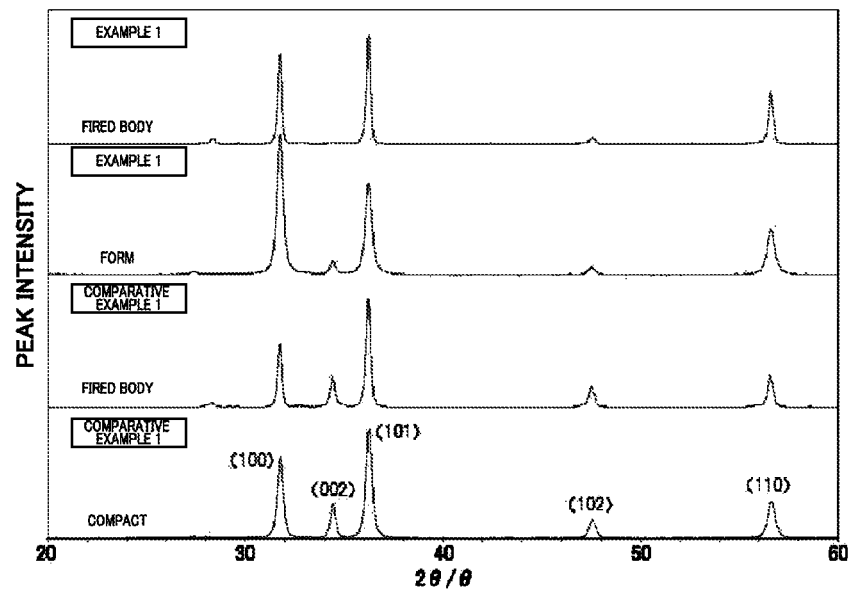
FIG. 1 is a graph showing X-ray diffraction patterns obtained in the example and the comparative example.

A voltage nonlinear resistor according to the present invention contains zinc oxide as a major component. In the voltage nonlinear resistor, the degree of orientation f(100) of the (100) plane of zinc oxide is 0.40 or more. In this case, an a-axis direction in which the conductivity of zinc oxide is high is oriented; hence, the resistance in zinc oxide grains is low and the voltage of a high-current region can be kept low. In the voltage nonlinear resistor of the present invention, a 'major component' is a component that is contained at a ratio of 50% by weight or more.

In the voltage nonlinear resistor according to the present invention, the degree of orientation f(002) of the (002) plane of zinc oxide is preferably 0.10 or less and is represented by the following equation:

$$f(002)=I(002)/(I(100)+I(002)+I(101)).$$

In this case, a c-axis direction in which the conductivity of zinc oxide is low is not oriented; hence, as a result, the resistance in the zinc oxide grains is low.

The voltage nonlinear resistor according to the present invention preferably contains either bismuth (Bi) or praseodymium (Pr) as a minor component in order to exhibit a nonlinear resistance characteristic.

The voltage nonlinear resistor according to the present invention may contain Bi, Sb, Co, Mn, Cr, Ni, Si, Al, B, and Ag as a minor component in terms of Bi, $Sb_2O_3$, $Co_2O_3$, $MnO_2$, $Cr_2O_3$, NiO, $SiO_2$, $Al^{3+}$, $B_2O_3$ or $Ag_2O$, respectively, that is, 0.1 mole percent to 5.0 mole percent $Bi_2O_3$, 0.02 mole percent to 5.0 mole percent $Sb_2O_3$, 0.1 mole percent to 5.0 mole percent $Co_2O_3$, 0.1 mole percent to 5.0 mole percent $MnO_2$, 0 mole percent to 1.0 mole percent $Cr_2O_3$, 0.1 mole percent to 5.0 mole percent NiO, 0.001 mole percent to 10.0 mole percent $SiO_2$, 0.001 mole percent to 0.05 mole percent $A^{3+}$, 0.0001 mole percent to 0.05 mole percent $B_2O_3$, and 0.001 mole percent to 0.05 mole percent $Ag_2O$.

In the nonlinear resistor according to the present invention, the average size of the zinc oxide grains is preferably 3 μm to 15 μm.

In the voltage nonlinear resistor according to the present invention, a crystal phase is preferably composed of ZnO, $Bi_2O_3$, and $Zn_7Sb_2O_{12}$ or composed of ZnO, $Bi_2O_3$, $Zn_7Sb_2O_{12}$, and $Zn_2SiO_4$.

The voltage nonlinear resistor according to the present invention is applicable to chip varistors.

The voltage nonlinear resistor according to the present invention can be fabricated by a method below. That is, the nonlinear resistor according to the present invention may be obtained in such a way that a raw material mixture containing zinc oxide as a major component is formed into an oriented form by orienting the (100) plane of zinc oxide using shear force and the oriented form is fired.

In the above method, 50% by weight or more of zinc oxide in the raw material mixture is preferably (100)-oriented plate-shaped zinc oxide particles. The raw material mixture used is preferably a mixed powder containing zinc oxide as a major component and Bi, Sb, Co, Mn, Cr, Ni, Si, Al, B, and Ag as a minor component in terms of $Bi_2O_3$, $Sb_2O_3$, $Co_2O_3$, $MnO_2$, $Cr_2O_3$, NiO, $SiO_2$, $Al^{3+}$, $B_2O_3$, or $Ag_2O$, respectively, that is, 0.1 mole percent to 5.0 mole percent $Bi_2O_3$, 0.02 mole percent to 5.0 mole percent $Sb_2O_3$, 0.1 mole percent to 5.0 mole percent CoA, 0.1 mole percent to 5.0 mole percent $MnO_2$, 0 mole percent to 1.0 mole percent $Cr_2O_3$, 0.1 mole percent to 5.0 mole percent NiO, 0.001 mole percent to 10.0 mole percent $SiO_2$, 0.001 mole percent to 0.05 mole percent $Al^{3+}$, 0.0001 mole percent to 0.05 mole percent $B_2O_3$, and 0.001 mole percent to 0.05 mole percent $Ag_2O$.

In the above method, for example, tape casting, extrusion molding, a doctor blade process, or the like can be used to form the oriented form using shear force. In this case, it is preferred that the raw material mixture is formed into slurry and the slurry is fed through a discharge hole such that the oriented form is formed so as to be sheet-shaped. The oriented form is preferably prepared such that the degree of orientation f(100) of the (100) plane of zinc oxide is 0.50 or more. Furthermore, in the oriented form, the degree of orientation f(002) of the (002) plane of zinc oxide is 0.10 or less.

In the above method, after being degreased, the oriented form is preferably fired. The oriented form is preferably fired at 900° C. to 1,200° C. and atmospheric pressure in air. After being fired, the oriented form is preferably heat-treated at 400° C. to 600° C. in order to enhance the life of the voltage nonlinear resistor. In the case of using sheet-shaped oriented forms, after the sheet-shaped oriented forms are stacked, the stack may be pressed prior to firing.

The present invention is not limited to the above embodiments. Various modifications may be made within the technical scope of the present invention

EXAMPLES

Example 1

A raw material powder of zinc oxide was prepared by a method below. A 0.1 M aqueous solution of $Zn(NO_3)_2$ was prepared using zinc nitrate hexahydrate (produced by Kanto Chemical Co., Inc.). Furthermore, a 0.1 M aqueous solution of NaOH was prepared using sodium hydroxide (produced by Sigma-Aldrich Co., LLC). The NaOH aqueous solution and the $Zn(NO_3)_2$ aqueous solution were mixed together at a volume ratio of 1:1, followed by stirring and holding at 80° C. for 6 hours, whereby a precipitate was obtained. The precipitate was washed with ion-exchanged water 3 times and was then dried, whereby spherical secondary particles composed of aggregated plate-shaped zinc oxide primary particles were obtained. Subsequently, the spherical secondary particles were crushed into plate-shaped primary particles with a volume-based D50 average particle size of 0.6 μm in such a way that the spherical secondary particles were treated for 4 hours in a ball mill using $ZrO_2$ balls with a diameter of 2 mm and isopropyl alcohol (IPA) as a dispersion medium. The plate-shaped primary particles were oriented in the (100) plane as confirmed by transmission electron microscope imaging and selected-area electron diffraction.

Predetermined amounts of additive materials other than an Al component were weighed so as to form a composition shown in Table 1 and were then crushed for 16 hours in a ball mill using $ZrO_2$ balls with a diameter of 5 mm and water as a dispersion medium so as to have a D50 average particle size of 0.6 μm. Herein, the whole of $B_2O_3$, the whole of $Ag_2O$, a portion of $Bi_2O_3$, and a portion of $SiO_2$ were made from glass frits each containing $Bi_2O_3$, $SiO_2$, $B_2O_3$, or $Ag_2O$. A mixture of the crushed additives was mixed with a predetermined amount of $Al^{3+}$ in the form of an aqueous solution of aluminium nitrate, followed by drying, whereby an additive material-mixed powder was obtained.

TABLE 1

| | Mixture Composition (mol %) | | | | | | | | | |
|---|---|---|---|---|---|---|---|---|---|---|
| | | | | | Additive Material | | | | | |
| ZnO | $Bi_2O_3$ | $Sb_2O_3$ | $Co_2O_3$ | $MnO_2$ | NiO | $SiO_2$ | $Al^{3+}$ | $B_2O_3$ | $Ag_2O$ |
| 97.190 | 0.511 | 0.138 | 0.449 | 0.337 | 0.403 | 0.156 | 0.013 | 0.001 | 0.002 |

Fifteen parts by weight of a binder (polyvinyl butyral, product number BM-2, produced by Sekisui Chemical Co., Ltd.), 6.2 parts by weight of a plasticizer (DOP: di(2-ethylhexyl) phthalate, produced by Kurogane Kasei Co., Ltd.), 3 parts by weight of a dispersant (Rheodol™ $Y^4$ SP-O 30 produced by Kao Corporation), and a dispersion medium (2-ethylhexanol) were mixed with 100 parts by weight of a mixture of the plate-shaped primary particles and additive material-mixed powder that were weighed so as to form the composition shown in Table 1, whereby slurry was prepared. The amount of the dispersion medium was adjusted such that the viscosity of the slurry was 20,000 cP to 30,000 cP. The slurry was applied to a PET film by a doctor blade process such that a sheet having a thickness of 24 μm after drying was formed thereon.

The (100) plane and (002) plane of a tape (form) taken from the sheet were measured for the degree of orientation by XRD. The measurement was performed in such a way that an XRD profile was measured by applying an X-ray to a surface of the tape (form) using an XRD apparatus (RINT™-TTR III, manufactured by Rigaku Corporation, a parallel beam optical system). The following equation was used to calculate f(hkl), that is, the degree of orientation of a (hkl) plane:

$$f(hkl)=I(hkl)/(I(100)+I(002)+I(101))$$

where I(hkl) represents the peak intensity (integral) of a (hkl) plane of a sample.

In the example, the degree of orientation f(100) and that of f(002) were 0.55 and 0.05, respectively.

The tape was cut into circular pieces with a diameter of 20 mm, 100 of the circular pieces were stacked on an aluminium plate with a thickness of 10 mm, and the stack was vacuum-packed. The vacuum-packed stack was isostatically pressed with a pressure of 100 kgf/cm$^2$ in 85° C. hot water, whereby a disk-shaped form was prepared. The disk-shaped form was placed in a degreasing furnace, was heated at a rate of 25° C./h, and was then degreased at a maximum temperature of 450° C. for 5 hours. A degreased body thereby obtained was heated at a rate of 30° C./h and was then fired at a maximum temperature of 1,040° C. and atmospheric pressure for 5 hours in air.

Glass paste (BL 202, produced by Central Glass Co., Ltd.) was applied to side surface of the fired body and the fired body was heat-treated at 500° C. for 2 hours in air, whereby the glass paste was baked and side-surface high-resistance layer was thereby formed. A disk-shaped zinc oxide voltage nonlinear resistor was thereby obtained. This heat treatment is useful in enhancing the life of the disk-shaped zinc oxide voltage nonlinear resistor. Both end surfaces of the disk-shaped zinc oxide voltage nonlinear resistor were polished with #800 SiC paper and were then washed.

The degree of orientation of the (100) plane and that of the (002) plane in the upper surface of an obtained fired body (the disk-shaped zinc oxide voltage nonlinear resistor), that is, f(100) and f(002) were 0.43 and 0.01, respectively. Furthermore, the degree of orientation f//(002) of the (002) plane in a surface of a similarly prepared fired body, the surface being perpendicular to a disk surface and being parallel to the drawing direction of the PET film, was 0.30 and the degree of orientation f⊥(002) of the (002) plane in a surface of this fired body, the surface being perpendicular to the disk surface and being perpendicular to the drawing direction of the PET film, was also 0.30. That is, the anisotropy of in-plane c-axis orientation was not observed. Incidentally, an equation for calculating f//(002) or f⊥(002) is the same as that for calculating f(hkl).

Figure 2:
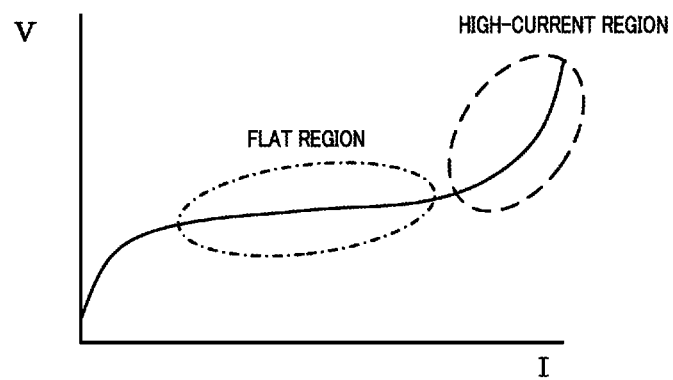
FIG. 2 is a graph showing the current-voltage characteristic of a voltage nonlinear resistor.

The disk-shaped zinc oxide voltage nonlinear resistor obtained as above had a diameter of 17 mm and a height of 1.6 mm. In—Ga electrodes were applied to the polished end surfaces of the disk-shaped zinc oxide voltage nonlinear resistor (the upper and lower surfaces of a disk), whereby a varistor element was prepared. The current-voltage characteristic of the varistor element was measured. The voltage at a current (a flat region in FIG. 2) corresponding to 2 mA/cm$^2$ was 363 V/mm and the voltage at a current (a high-current region in FIG. 2) corresponding to 2 kA/cm$^2$ was 590 V/mm.

Figure 3:
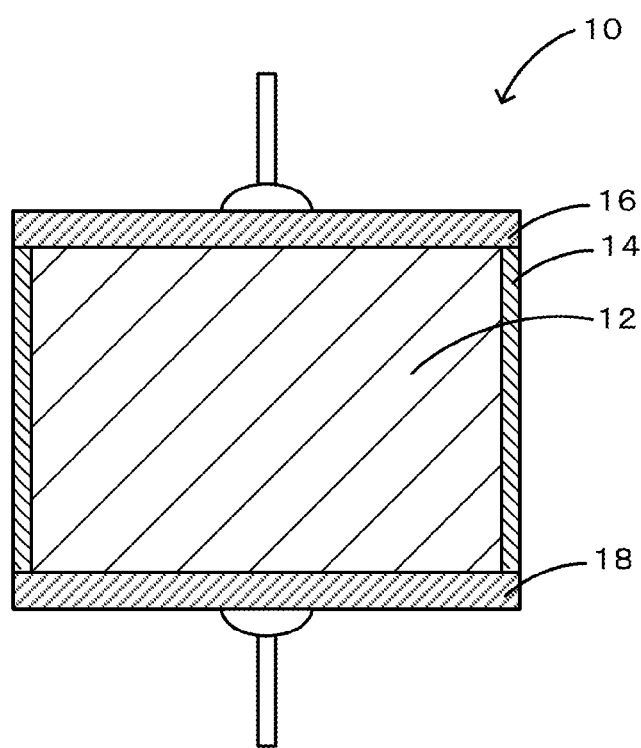
FIG. 3 is a schematic sectional view of a varistor element 10.

FIG. 3 is a schematic sectional view of the varistor element prepared in Example 1. The varistor element 10 includes the disk-shaped zinc oxide voltage nonlinear resistor 12, high-resistance layer 14 placed on side surface of the disk-shaped zinc oxide voltage nonlinear resistor 12, and a pair of electrodes 16 and 18 placed on the upper and lower surfaces, respectively, of the disk-shaped zinc oxide voltage nonlinear resistor 12. The degree of orientation f(100) of the (100) plane in each of the upper and lower surfaces of the varistor element 10 is high.

Comparative Example 1

Predetermined amounts of additive materials other than zinc oxide and Al component were weighed so as to form a composition shown in Table 1 and were then crushed in a ball mill in substantially the same way as that described in the example, whereby an additive material mixture was obtained. Predetermined amounts of plate-shaped zinc oxide primary particles prepared in substantially the same way as that described in the example and an aqueous solution of aluminium nitrate were added to the additive material mixture, followed by adjustment such that the content of water was 50% by weight, ultrasonic stirring for 60 minutes together with slight amounts of a binder, a dispersant, and an antifoaming agent, mixing for 30 minutes by blade stirring, and then granulation using a spray dryer, whereby granules were obtained. After being sieved through a screen with 200 μm openings, the granules were uniaxially pressed with a pressure of 800 kgf/cm$^2$, whereby a compact with a diameter of 26 mm and a height of 10 nm was obtained.

The degree of orientation of the (100) plane and that of the (002) plane of the compact, that is, f(100) and f(002) were 0.35 and 0.13, respectively.

The compact was degreased and fired under substantially the same conditions as those described in the example and side-surface high-resistance layer was formed in substantially the same way as that described in the example, whereby a zinc oxide voltage nonlinear resistor was obtained. Both end surfaces of the zinc oxide voltage nonlinear resistor were polished with #800 SiC paper and were then washed.

The degree of orientation of the (100) plane and that of the (002) plane of the zinc oxide voltage nonlinear resistor, that is, f(100) and f(002) were 0.29 and 0.15, respectively. Furthermore, the degrees of orientation f//(002) and f⊥(002) of two surfaces of a similarly prepared fired body, the surfaces being perpendicular to a pressing direction and intersecting each other at right angles, were both 0.25. That is, the anisotropy of in-plane c-axis orientation was not observed.

The zinc oxide voltage nonlinear resistor had a diameter of 20 mm and a height of 8 mm. In—Ga electrodes were applied to the polished end surfaces of the zinc oxide voltage nonlinear resistor, followed by the measurement of current-voltage characteristic. The voltage at a current (a flat region in FIG. 2) corresponding to 2 mA/cm$^2$ was 365 V/mm and the voltage at a current (a high-current region in FIG. 2) corresponding to 2 kA/cm$^2$ was 608 V/mm.

Results obtained in Example 1 and Comparative Example 1 are summarized in Table 2. FIG. 1 shows XRD charts of the form and fired body obtained in Example 1 and XRD charts of the compact and fired body obtained in Comparative Example 1. In the compact and fired body obtained in Comparative Example 1, f(100) is low as compared to the form and fired body obtained in Example 1. This is probably because in Example 1, shear force was applied when forming the form and therefore a-axis orientation was likely to occur; however, in Comparative Example 1, very little shear force was applied when forming the compact.

TABLE 2

|  | Example 1 | | Comparative Example 1 | |
| --- | --- | --- | --- | --- |
|  | Form | Fired Body | Compact | Fired body |
| f(100) | 0.55 | 0.43 | 0.35 | 0.29 |
| f(002) | 0.05 | 0.01 | 0.13 | 0.15 |
| f//(002) | — | 0.30 | — | 0.25 |
| f⊥(002) | — | 0.30 | — | 0.25 |
| $V_{2\,mA/cm2}$ [※1] | — | 363 | — | 365 |
| $V_{2\,kA/cm2}$ [※2] | — | 590 | — | 608 |

[※1] Voltage at current corresponding to 2 mA/cm$^2$ (unit: V/mm)
[※2] Voltage at current corresponding to 2 kA/cm$^2$ (unit: V/mm)

The present application claims priority from Japanese Patent Application No. 2013-120403 filed on Jun. 7, 2013, the entire contents of which are incorporated herein by reference.

INDUSTRIAL APPLICABILITY

A voltage nonlinear resistor according to the present invention is applicable to various sensors such as humidity sensors and temperature sensors, arresters for electric power systems, and the like.

What is claimed is:

1. A voltage nonlinear resistor containing zinc oxide as a major component, wherein the degree of orientation f(100) of the (100) plane of zinc oxide is 0.40 or more and is represented by the following equation:

$$f(100)=I(100)/(I(100)+I(002)+I(101))$$

where I(hkl) represents an integral peak intensity of a (hkl) plane.

2. The voltage nonlinear resistor according to claim 1, wherein the degree of orientation f(002) of the (002) plane of zinc oxide is 0.10 or less and is represented by the following equation:

$$f(002)=I(002)/(I(100)+I(002)+I(101))$$

where I(hkl) represents the integral peak intensity of the (hkl) plane.

* * * * *